United States Patent
Sakaguchi et al.

(10) Patent No.: US 6,199,103 B1
(45) Date of Patent: Mar. 6, 2001

(54) ELECTRONIC MAIL DETERMINATION METHOD AND SYSTEM AND STORAGE MEDIUM

(75) Inventors: Manabu Sakaguchi; Akira Sawada; Fujiki Fujii; Masaki Hori, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/102,768

(22) Filed: Jun. 23, 1998

(30) Foreign Application Priority Data

Jun. 24, 1997 (JP) .................................................. 9-181819

(51) Int. Cl.[7] .................................................. G06F 15/16
(52) U.S. Cl. ...................... 709/206; 379/93.01; 709/204; 709/206
(58) Field of Search .............................. 706/47; 709/206, 709/207, 205, 203; 370/401, 465

(56) References Cited

U.S. PATENT DOCUMENTS

| | | | |
|---|---|---|---|
| 5,283,856 | * | 2/1994 | Gross et al. ............................ 706/47 |
| 5,377,354 | * | 12/1994 | Scannell et al. ...................... 709/206 |
| 5,826,022 | * | 10/1998 | Nielsen ................................ 709/206 |
| 5,948,058 | * | 7/1999 | Kudoh et al. ........................ 709/206 |

* cited by examiner

Primary Examiner—Zarni Maung
Assistant Examiner—Tammy Tak-Kam Lee
(74) Attorney, Agent, or Firm—Dickstein Shapiro Morin & Oshinsky, LLP (57) ABSTRACT

The invention is directed to a system that can easily generate determination conditions and determine a plurality of similar junk electronic mail pieces based on one determination condition. An electronic mail determination system comprises a junk electronic mail determination processing section (2) for determining whether or not a given electronic mail piece through an input section (1) is junk based on the determination condition stored in a junk electronic mail determination condition storage section (3), an estimated junk electronic mail storage section (6) for storing the electronic mail piece if the electronic mail piece is determined junk by the junk electronic mail determination processing section, and a junk electronic mail exemplification learning section (7) for analyzing content information of the electronic mail piece stored in the storage section (6) for extracting a feature amount to determine that electronic mail is junk and adding the extracted feature amount to the junk electronic mail determination condition storage section as a junk electronic mail determination condition. A keyword vector is used as the determination condition.

20 Claims, 5 Drawing Sheets

ELECTRONIC MAIL DETERMINATION METHOD AND SYSTEM AND STORAGE MEDIUM

BACKGROUND OF THE INVENTION

This invention relates to an electronic mail determination method and system and a storage medium.

With a conventional electronic mail reception unit, the receiving person must check the contents of all received electronic mail and select necessary electronic mail. However, in recent years, information not requested by the receiving persons, such as direct mail, has been increasing. The storage capacity and output of the receiving unit are wasted on the unnecessary information, and the receiving person must spend most of the time in selecting received information and may miss or discard useful received information when selecting from the received information.

Then, to efficiently handle received electronic mail, the receiving person needs to handle electronic mail in response to the electronic mail contents in a different manner such that unnecessary electronic mail is deleted as it is received or that if the receiving person reads the electronic mail, he or she does this when he or she has some free time. Therefore, an electronic mail determination system for determining whether or not received electronic mail is unnecessary junk electronic mail becomes an important element.

As in a conventional electronic mail determination system, for example, character strings appearing in header fields and texts in junk electronic mail are previously stored as determination conditions, and when determining s whether nor not received electronic mail deserves to be read, a check is made to see if the character strings exist in the header field or text in the electronic mail.

However, in the conventional system, the work of extracting the conditions for determining electronic mail to be junk from the junk electronic mail must be executed by human hands. Therefore, determination performance cannot be maintained unless the receiving person executes the work each time a new type of junk electronic mail is sent.

An extremely large number of types of junk electronic mail exist and further a new type is created one after another and sent to receiving persons. Thus, the receiving person must spend much time in adding and maintaining the determination conditions.

The essence of the problems lies in that the determination conditions need to be prepared by human hands and that although electronic mail having the contents completely matching one determination condition can be determined junk, electronic mail having contents not completely matching one determination condition, but similar thereto cannot be determined junk.

SUMMARY OF THE INVENTION

It is therefore an object of the invention to provide an electronic mail determination method and system and a storage medium having an exemplification learning function of automatically generating and storing a junk electronic mail determination condition by specifying at least one junk electronic mail example and a capability of using the junk electronic mail determination condition to determine whether or not received electronic mail is junk, thereby solving the problems.

To this end, according to the invention, there is provided an electronic mail determination method comprising the steps of determining whether or not a given electronic mail piece is junk based on a determination condition stored in a junk electronic mail determination condition storage section, if the electronic mail piece is determined junk, storing it in an estimated junk electronic mail storage section, reading the electronic mail piece stored in the estimated junk electronic mail storage section and analyzing content information of the electronic mail piece for extracting the feature amount to determine that electronic mail is junk, and adding the extracted feature amount to the junk electronic mail determination condition storage section as a junk electronic mail determination condition. (claim 1)

The determining step can adopt any one of various methods; for example, it can determine whether or not the determination condition is similar to the feature amount extracted from the given electronic mail piece. (claim 2) As the determination condition format for determining similar junk electronic mail, a method of using a keyword vector extracted from the junk electronic mail piece or the like can be adopted.

On the other hand, the electronic mail determination method may further comprise the steps of storing an electronic mail piece determined non-junk at the determining step in an estimated junk electronic mail storage section, reading the electronic mail piece stored in the estimated non-junk electronic mail storage section and analyzing content information of the electronic mail piece for extracting the feature amount to determine that electronic mail is non-junk, and adding the extracted feature amount to the non-junk electronic mail determination condition storage section as a non-junk electronic mail determination condition. The determining step may determine whether or not the given electronic mail piece is junk based on the determination condition stored in the junk electronic mail determination condition storage section and the determination condition stored in the non-junk electronic mail determination condition storage section. (claim 3)

Electronic mail stored in the estimated junk electronic mail storage section after the expiration of a predetermined time interval from the determining step time may be automatically deleted. (claim 4)

The electronic mail determination method may further comprise the steps of extracting the feature amount of the electronic mail piece stored in the estimated non-junk electronic mail storage section, storing the extracted feature amount in a non-junk electronic mail feature amount storage section, and subtracting the feature amount stored in the non-junk electronic mail feature amount storage section from the feature amount generated based on junk electronic mail stored in the junk electronic mail storage section and storing the resultant feature amount in the junk electronic mail determination condition storage section as a junk electronic mail determination condition. (claim 5)

A system for carrying out the method can comprise a junk electronic mail determination condition storage section for storing a determination condition to determine whether or not electronic mail is junk, a junk electronic mail determination processing section for determining whether or not a given electronic mail piece is junk based on the determination condition stored in the junk electronic mail determination condition storage section, an estimated junk electronic mail storage section for storing the electronic mail piece if the electronic mail piece is determined junk by the junk electronic mail determination processing section, and a junk electronic mail exemplification learning section for analyzing content information of the electronic mail piece stored in the estimated junk electronic mail storage section for extracting the feature amount to determine that electronic mail is junk and adding the extracted feature amount to the junk electronic mail determination condition storage section as a junk electronic mail determination condition. (claim 6) The system is provided by the first embodiment of the invention.

The junk electronic mail exemplification learning section may generate a determination condition to determine a similar junk electronic mail piece and the junk electronic mail determination processing section may determine whether or not the determination condition is similar to the feature amount extracted from the given electronic mail piece. (claim 7) As the determination condition format for determining similar junk electronic mail, for example, a method of using a keyword vector extracted from the junk electronic mail piece or the like can be adopted.

The system may further include an estimated non-junk electronic mail storage section for storing the electronic mail piece determined non-junk by the junk electronic mail determination processing section, and a non-junk electronic mail exemplification learning section for analyzing content information of the electronic mail piece stored in the estimated non-junk electronic mail storage section for extracting the feature amount to determine that electronic mail is non-junk and adding the extracted feature amount to the non-junk electronic mail determination condition storage section as a non-junk electronic mail determination condition, wherein the junk electronic mail determination processing section may determine whether or not the given electronic mail piece is junk based on the determination condition stored in the junk electronic mail determination condition storage section and the determination condition stored in the non-junk electronic mail determination condition storage section. (claim 8)

The system may further include a deletion processing section for automatically deleting electronic mail stored in the estimated junk electronic mail storage section after the expiration of a predetermined time interval from the determination processing time. (claim 9) The invention as claimed in claim 8 or 9 is embodied by the second embodiment of the invention.

The system may further include a non-junk electronic mail feature amount extraction section for extracting the feature amount of the electronic mail piece stored in the estimated non-junk electronic mail storage section, and a non-junk electronic mail feature amount storage section for storing the extracted feature amount, wherein the junk electronic mail exemplification learning section may subtract the feature amount stored in the non-junk electronic mail feature amount storage section from feature amount generated based on junk electronic mail stored in the junk electronic mail storage section and adopt the resultant feature amount as a junk electronic mail determination condition. (claim 10) The system is provided by the third embodiment of the invention.

Further, as claimed in claims 11–15, a recording medium storing programs for executing the steps may be provided.

According to the invention, the exemplification learning function of analyzing the content information of an electronic mail piece and generating and storing a determination condition for determining the electronic mail piece is provided, and the generated and stored determination condition can be used to determine whether or not an unknown electronic mail piece is junk. That is, the user simply specifies predetermined electronic mail of received electronic mail, whereby determination conditions are automatically generated, facilitating processing.

According to the invention as claimed in claims 2, 7, and 11, the similarity determination function of determining that other similar electronic mail pieces are junk according to the determination condition generated from one junk electronic mail piece is provided, so that determination conditions to determine that electronic mail is junk can be generated with extremely small efforts. In other words, a large number of types of electronic mail can be determined junk simply by performing exemplification learning for a small number of electronic mail pieces.

Further, according to the invention as claimed in claims 3, 5, 8, 10, 13, and 15, if determination conditions are also generated based on electronic mail determined nonjunk, whether or not electronic mail is junk can be determined with higher accuracy.

Junk electronic mail originally is unnecessary mail not to be read. Therefore, after determination conditions are generated, preferably junk electronic mail is deleted to decrease the required memory. Thus, according to the invention as claimed in claims 4, 9, and 14, junk electronic mail is deleted automatically after the expiration of a predetermined time interval with no labor or time needed. A determination condition may be generated based on an estimated junk electronic mail piece immediately after the electronic mail piece is determined junk, or estimated junk electronic mall based on which determination conditions are to be generated may be specified after the expiration of a certain time interval (constant or random depending on the user). If the determination condition is generated immediately after the electronic mail piece is determined junk as in the former case, a time lag exists by the time the determination condition is generated. Therefore, preferably the predetermined time interval for automatically deleting junk electronic mail is set to a time interval at least until determination condition generation based on stored electronic mail becomes executed (its probability is high). The value may either be fixed or adjustable by the user.

Definition of Terminologies

Junk electronic mail

Electronic mail containing only unnecessary information for the receiving person.

Non-junk electronic mail

Electronic mail received at an electronic mail receiving unit other than the junk electronic mail. It is electronic mail containing necessary information for the receiving person.

Estimated junk electronic mail

Electronic mail determined junk by an electronic mail determination unit.

Estimated non-junk electronic mail

Electronic mail determined non-junk by an electronic mail determination unit.

Keyword vector

A document representation method used in a vector space technique in a document retrieval technology field and a feature amount to identify a document, represented as a pair list of a keyword extracted from the document and weight calculated from the occurrence frequency, etc., of the keyword in the document. Similarity can be defined for two keywords and thus can be used to calculate the similarity between the two corresponding documents indirectly.

Exemplification learning

Example data and output result expected when the data is input are given in a unit to or from which data is input or output, whereby the input/output characteristics of the unit are controlled.

Mail content information

Entries in electronic mail header fields such as transmitting person name (information described on the line beginning with From:), destination (information described on the line beginning with To:), and return destination (information described on the line beginning with Replay to:), or text in the body of the electronic mail.

The present disclosure relates to the subject matter contained in Japanese patent application No. Hei. 9-181819 (filed on Jun. 24, 1997) which is expressly incorporated herein by reference in its entirety.

DETAILED DESCRIPTION OF THE PREFERRED EMBODIMENTS

Figure 1:
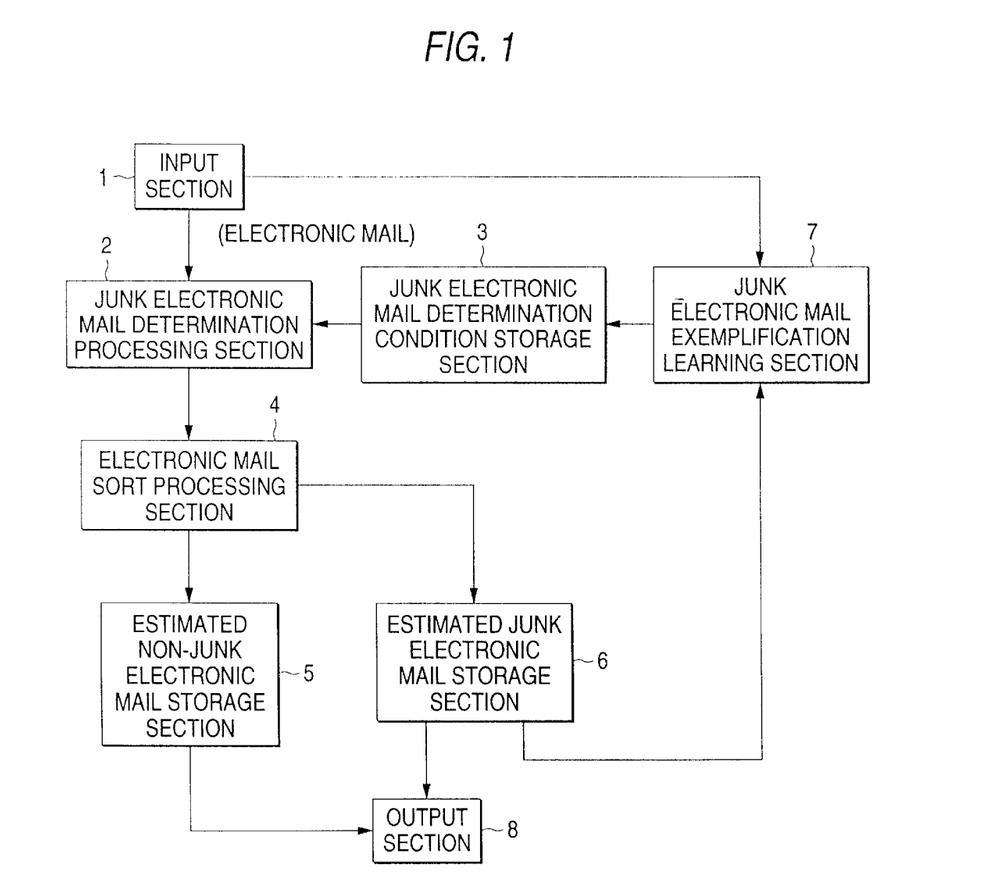
FIG. 1 is a block diagram to show a first embodiment of an electronic mail determination system according to the invention.

FIG. 1 shows a first embodiment of an electronic mail determination system according to the invention. First, outlining the embodiment, the system has the following two functions:

(1) determining whether input electronic mail is junk or non-junk electronic mail, sorting the electronic mail according to the determination result, and storing the electronic mail; and (2) generating junk electronic mail determination conditions from specified electronic mail and adding the conditions to a junk electronic mail determination condition storage section.

To provide the functions, the embodiment adopts the following technique wherein:

junk electronic mail determination conditions take a keyword vector format; and in junk electronic mail determination processing, all junk electronic mail determination conditions stored in the junk electronic mail determination condition storage section are used to calculate the prediction degree of the possibility that electronic mail being evaluated may be junk, which will be hereinafter referred to as the junk degree, and if the total value, which is the total junk degree of the electronic mail, exceeds a preset threshold value, the electronic mail is determined junk.

Next, a specific configuration will be discussed. As shown in FIG. 1, electronic mail data to be evaluated in the system is sent through an input section 1 to a junk electronic mail determination processing section 2, which then determines whether given electronic mail is junk or nonjunk based on the determination conditions stored in a junk electronic mail determination condition storage section 3. Specific determination processing will be described later.

The junk electronic mail determination processing section 2 sends the determination result to an electronic mail sort processing section 4 at the following stage. If the electronic mail sort processing section 4 determines that the electronic mail is estimated non-junk electronic mail according to the given determination result, the electronic mail is stored in an estimated non-junk electronic mail storage section 5 as estimated non-junk electronic mail; if the electronic mail sort processing section 4 determines that the electronic mail is estimated junk electronic mail, the electronic mail is stored in an estimated junk electronic mail storage section 6 as estimated junk electronic mail.

The embodiment further includes a junk electronic mail exemplification learning section 7, which generates a junk electronic mail determination condition in the keyword vector format based on the electronic mail stored in the estimated junk electronic mail storage section 6 (estimated junk electronic mail) and adds and stores the condition to and in the junk electronic mail determination condition storage section 3.

Further, information concerning the electronic mail stored in the electronic mail storage sections 5 and 6 can be displayed through an output section 8 such as a display unit. The user needs only to see the data stored in the estimated non-junk electronic mail storage section 5 and thus can eliminate fruitless reading of unnecessary junk mail and obtain prompt mail handling.

The user can also see the data stored in the estimated junk electronic mail storage section 6 and can specify the electronic mail to be learnt in exemplification through the input section 1. Estimated junk electronic mail can also be displayed on the output section 8, whereby the user can check electronic mail later even if the determination system makes an erroneous determination.

Figure 2:
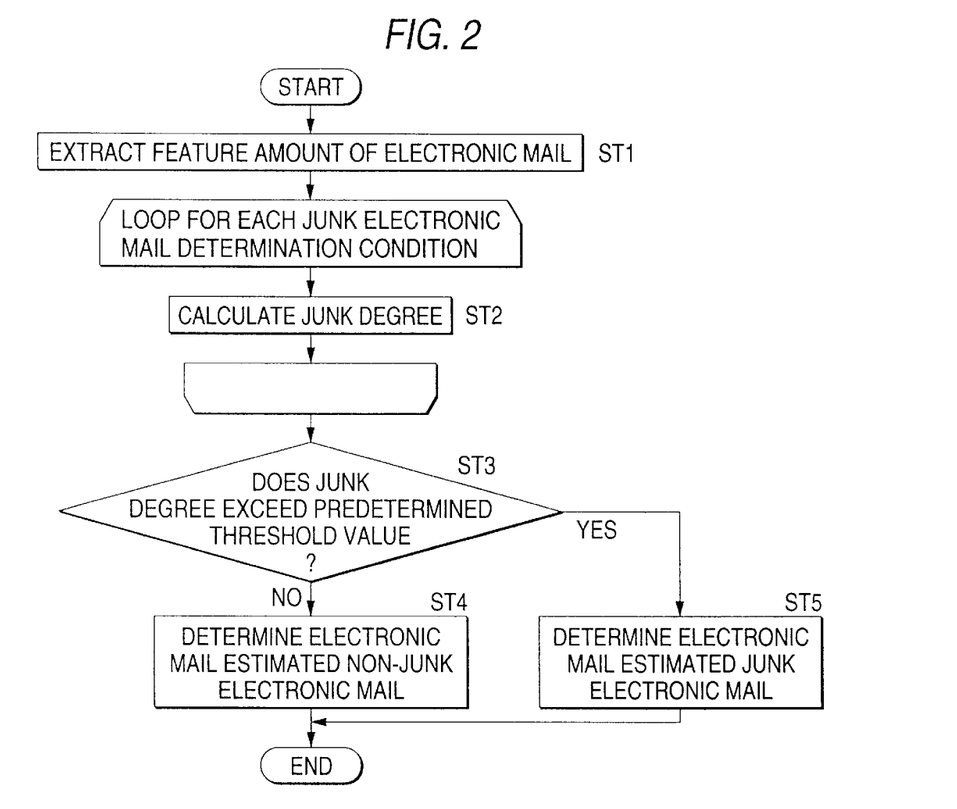
FIG. 2 is a flowchart to describe the function of a junk electronic mail determination processing section.

Next, the sections will be discussed. The junk electronic mail determination processing section 2 has a function of executing a flowchart as shown in FIG. 2. That is, first the feature amount of electronic mail being evaluated is extracted at step ST1. Specifically, a keyword vector is extracted by a vector space technique used in a document retrieval technology field based on extracted keywords and importance thereof at step ST1. After a space is left between words of the text in a document sent by electronic mail, for example, speech part analysis is executed and only nouns can be extracted as keywords. The importance can be found based on the occurrence frequency, etc., of the extracted keywords (nouns); the higher the occurrence frequency of the keyword, the higher the importance of the keyword. Various automatic keyword extraction techniques used to put documents into a database can be applied to such keyword extraction processing, etc.

Next, the junk electronic mail determination conditions stored in the junk electronic mail determination condition storage section 3 are taken out one at a time, and the similarity to the keyword vector of the electronic mail being evaluated, found at step ST1, is calculated. This process is repeated for all the junk electronic mail determination conditions and the total value is adopted as the junk degree of the electronic mail being evaluated at step ST2.

Whether or not the found junk degree exceeds a preset threshold value is determined at step ST3. If the junk degree does not exceed the threshold value, the similarity to the determination conditions prepared based on junk electronic mail is low and thus the possibility that the electronic mail may be non-junk electronic mail is high. Then, the electronic mail is determined estimated non-junk electronic mail at step ST4. On the other hand, if the junk degree exceeds the threshold value, the similarity to the determination conditions prepared based on junk electronic mail is high and thus the possibility that the electronic mail may be junk is high. Then, the electronic mail is determined estimated junk electronic mail at step ST5.

The determination result and the corresponding electronic mail are sent from the junk electronic mail determination processing section 2 to the electronic mail sort processing section 4.

Figure 3:
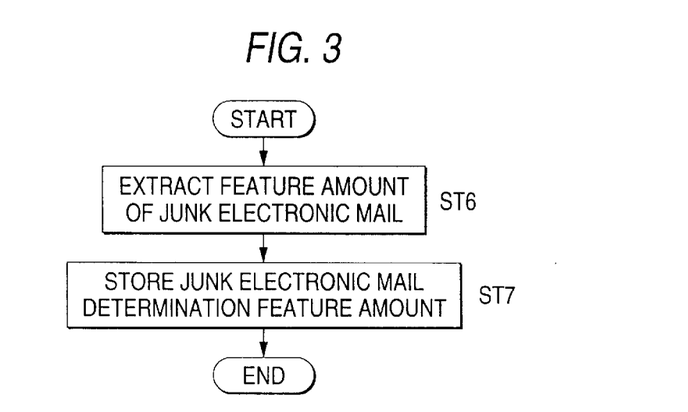
FIG. 3 is a flowchart to describe the function of a junk electronic mail exemplification learning section.

FIG. 3 is a flowchart to describe the function of the junk electronic mail exemplification learning section 7. As shown here, first the junk electronic mail piece specified through the input section 1 is taken from among the estimated junk electronic mail pieces stored in the estimated junk electronic mail storage section 6 and a keyword vector (feature amount) of the junk electronic mail piece is extracted at step ST6. The keyword vector is like that extracted at step 1 in the junk electronic mail determination processing section 2 described above. As a specific technique, for example, a technique previously used generally like that described in detail on page 421 and later of "Shizen Gengo Shori (Natural Language Processing)" edited by NAGAO MAKOTO, Iwanami Shoten) can be used. Any other technique can be used, needless to say.

Next, the keyword vector extracted at step ST6 is stored in the junk electronic mail determination condition storage section 3 as a junk electronic mail determination condition at step ST7.

According to the configuration as described above, junk electronic mail determination conditions can be automatically generated and stored by specifying junk electronic mail examples, and can be used to determine later received electronic mail. Moreover, the determination condition generated by the exemplification learning function uses the keyword vector format, thus whether or not given electronic mail is junk can be determined based on the similarity to the determination conditions and the determination condition generated from one junk electronic mail piece can be applied to determination as to whether or a plurality of types of junk electronic mail similar to the junk electronic mail piece; the determination condition generation time can be furthermore decreased.

Figure 4:
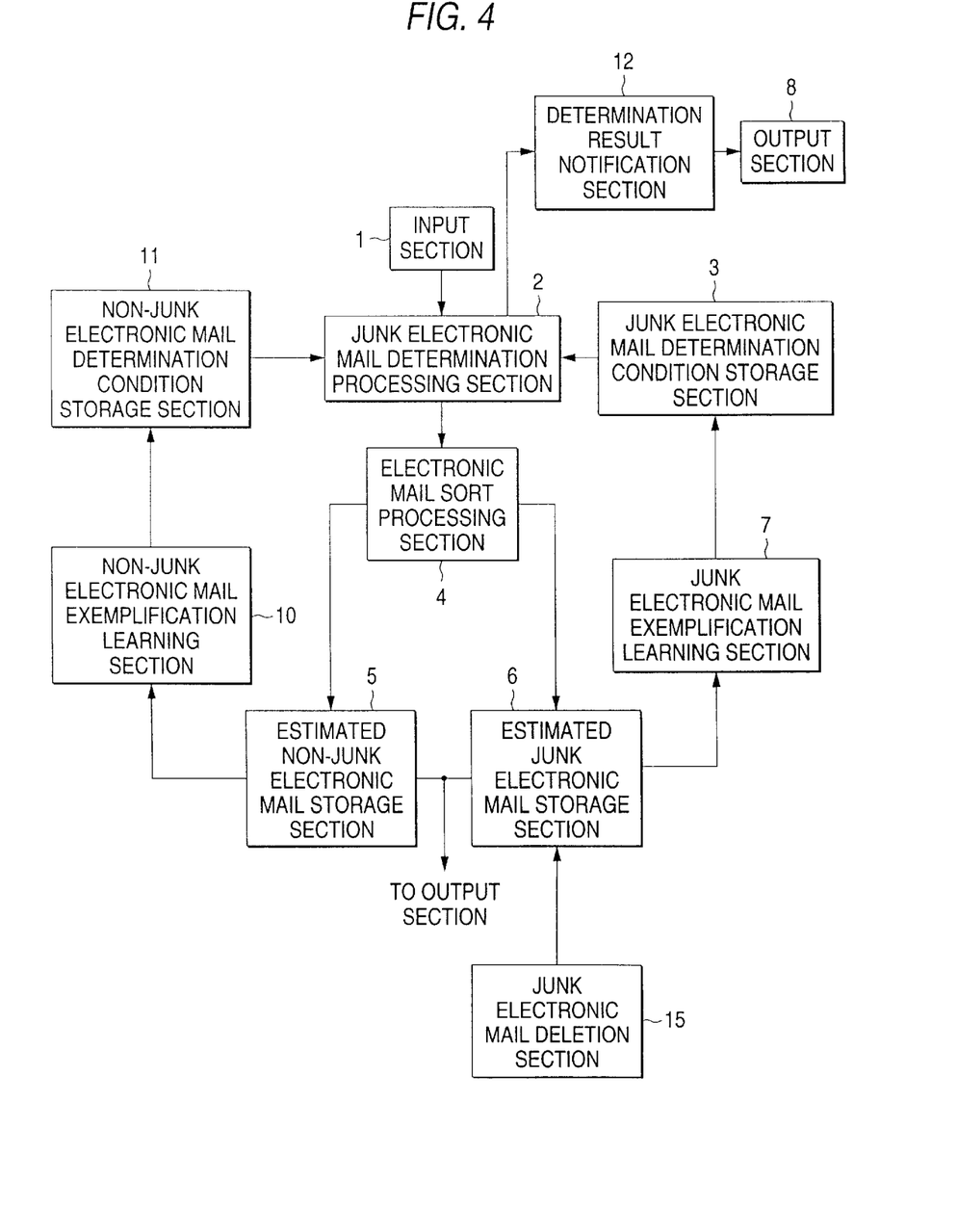
FIG. 4 is a block diagram to show a second embodiment of an electronic mail determination system according to the invention.

FIG. 4 shows a second embodiment of an electronic mail determination system according to the invention. As shown in the figure, in the embodiment, with the first embodiment as a basic configuration, determination conditions are also found based on non-junk electronic mail useful and necessary for the user and a junk electronic mail determination processing section 2 determines whether or not electronic mail is junk by totally judging determination conditions generated based on junk electronic mail and non-junk electronic mail.

First, the configuration of the system will be discussed. Parts similar to those previously described with reference to FIG. 1 are denoted by the same reference numerals in FIG. 4 and will not be discussed again in detail. The second embodiment has a non-junk electronic mail exemplification learning section 10. A non-junk electronic mail piece specified among non-junk electronic mail pieces stored in an estimated non-junk electronic mail storage section 5 is fed into the non-junk electronic mail exemplification learning section 10, which then analyzes content information of the electronic mail piece, generates a determination condition, and adds the condition to a non-junk electronic mail determination condition storage section 11.

The junk electronic mail determination processing section 2 extracts a keyword vector of given electronic mail as in the first embodiment and calculates the similarity between the extracted keyword vector and each determination condition stored in a junk electronic mail determination condition storage section 3. This process is repeated for all junk electronic mail determination conditions and the total value is adopted as the junk degree of the electronic mail. Likewise, the junk electronic mail determination processing section 2 finds the similarity between the extracted keyword vector and each of all non-junk mail determination conditions stored in the non-junk electronic mail determination condition storage section 11. The total value is adopted as the non-junk degree of the electronic mail. Therefore, the larger the non-junk degree of the electronic mail piece, the higher the probability that the electronic mail piece may be non-junk; the larger the junk degree of the electronic mail piece, the higher the probability that the electronic mail piece may be junk. Thus, the junk electronic mail determination processing section 2 considers the junk degree plus the non-junk degree totally and determines whether or not given electronic mail is junk or non-junk.

Further, in the embodiment, the determination result of the junk electronic mail determination processing section 2 is also fed into a determination result notification section 12, which enables the user to specify a notification method to the receiving person separately for estimated junk electronic mail and estimated non-junk electronic mail as he or she desires.

As the specified notification method, a method of listing electronic mail titles, etc., on the output section 8 and differently coloring estimated junk electronic mail and estimated non-junk electronic mail, a method of sorting electronic mail into estimated junk electronic mail and estimated non-junk electronic mail and adding them to their respective storage units (not shown), a method of prefixing a character string representing the determination result to each piece of electronic mail, a method of immediately deleting only estimated junk electronic mail and not notifying the receiving person of the estimated junk electronic mail, or the like can be applied.

Further, in the embodiment, a junk electronic mail deletion section 15 is provided for automatically deleting estimated junk electronic mail after the expiration of a prespecified time interval from the junk electronic mail determination processing time, thereby suppressing excessive storage of unnecessary electronic mail in an estimated junk electronic mail storage section 6 and a waste of the memory capacity and reducing the memory capacity.

The additional functions in the second embodiment need not all be satisfied at a time and at least one function may be added to the first embodiment, for example.

Figure 5:
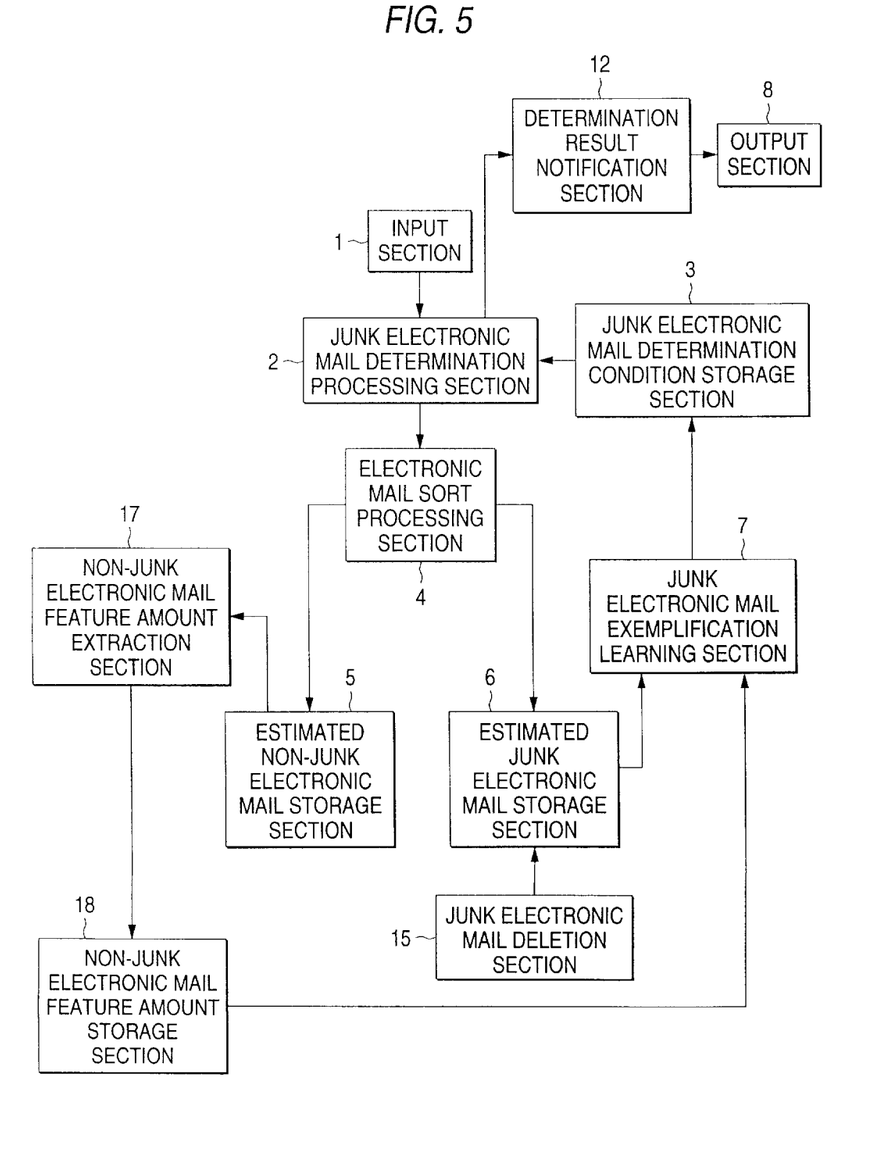
FIG. 5 is a block diagram to show a third embodiment of an electronic mail determination system according to the invention.

FIG. 5 shows a third embodiment of an electronic mail determination system according to the invention. As shown in the figure, in the embodiment, with the first embodiment as a basic configuration, the feature amount of non-junk electronic mail useful and necessary for the user is extracted and the extracted feature amount and the feature amount generated based on non-junk electronic mail are corrected for generating final junk electronic mail determination conditions.

Parts similar to those previously described with reference to FIG. 1 and FIG. 4 are denoted by the same reference numerals in FIG. 5 and will not be discussed again in detail. In the third embodiment, a non-junk electronic mail feature amount extraction section 17 is provided. A non-junk electronic mail piece specified among non-junk electronic mail pieces stored in an estimated non-junk electronic mail storage section 5 is fed into the non-junk electronic mail feature amount extraction section 17, which then analyzes content information of the electronic mail piece, extracts the feature amount thereof, and adds the feature amount to a non-junk electronic mail feature amount storage section 18. The feature amount is a keyword vector also in the embodiment. The non-junk electronic mail feature amount extraction section 17 has a similar function to that of the non-junk electronic mail exemplification learning section 10 in the second embodiment and the non-junk electronic mail feature amount storage section 18 can adopt a similar configuration to that of the non-junk electronic mail determination condition storage section 11 in the second embodiment.

A junk electronic mail exemplification learning section 7 analyzes content information of the specified estimated electronic mail piece for extracting the feature amount (keyword vector) thereof to determine whether or not the electronic mail piece is junk, subtracts the feature amount (keyword vector) stored in the non-junk electronic mail feature amount storage section 18 from the extracted feature amount, and stores the resultant feature amount in a junk electronic mail determination condition storage section 3 as a junk electronic mail determination condition.

In the embodiment, a determination result notification section 12 and a junk electronic mail deletion section 15 are also provided, but the invention is not limited to the configuration and at least either of the determination result notification section 12 and the junk electronic mail deletion section 15 may be uninstalled, of course.

In the third embodiment, the feature amount (keyword vector) extracted based on estimated non-junk electronic mail is used only to generate a junk electronic mail determination condition, but as in the second embodiment, a non-junk electronic mail determination condition is also generated and a junk electronic mail determination processing section 2 may determine whether or not electronic mail is junk based on both junk and non-junk electronic mail determination conditions, of course.

Further, although a specific configuration is not shown, it may be made possible to transfer a user-selected electronic mail piece among electronic mail pieces stored in the estimated non-junk electronic mail storage section 5 and the estimated junk electronic mail storage section 6 in each of the first to third embodiments to another storage section. That is, for example, in the determination processing section 2, electronic mail determined junk and stored in the estimated junk electronic mail storage section 6 can be transferred to the estimated non-junk electronic mail storage section 5 (at this time, it may be deleted from or left in the estimated junk electronic mail storage section 6). Of course, electronic mail stored in the estimated non-junk electronic mail storage section 5 can also be registered in the estimated junk electronic mail storage section 6.

In such a configuration, if the determination processing section 2 makes an erroneous determination and the electronic mail piece to be essentially determined junk is determined non-junk and is stored in the estimated non-junk electronic mail storage section 5, when the user sees an output section 8 and recognizes the erroneous determination, he or she can register the electronic mail piece in the estimated junk electronic mail storage section 6 and specify the registered electronic mail piece based on which a junk electronic mail determination condition can be generated. The later determination is made considering the new added determination condition. Thus, when whether or not another similar electronic mail piece is junk is determined, the possibility of an erroneous determination is suppressed as much as possible. This can also be applied to the case where non-junk electronic mail is erroneously determined junk. In this case, however, the function is effective particularly in the second and third embodiments (in the first embodiment, electronic mail erroneously registered in the estimated non-junk electronic mail storage section 5 may be unspecified).

The above-described embodiments assume that the sections are built in the system, but a program for executing the above-described processing may be recorded on a predetermined recording medium for distribution.

Figure 6:
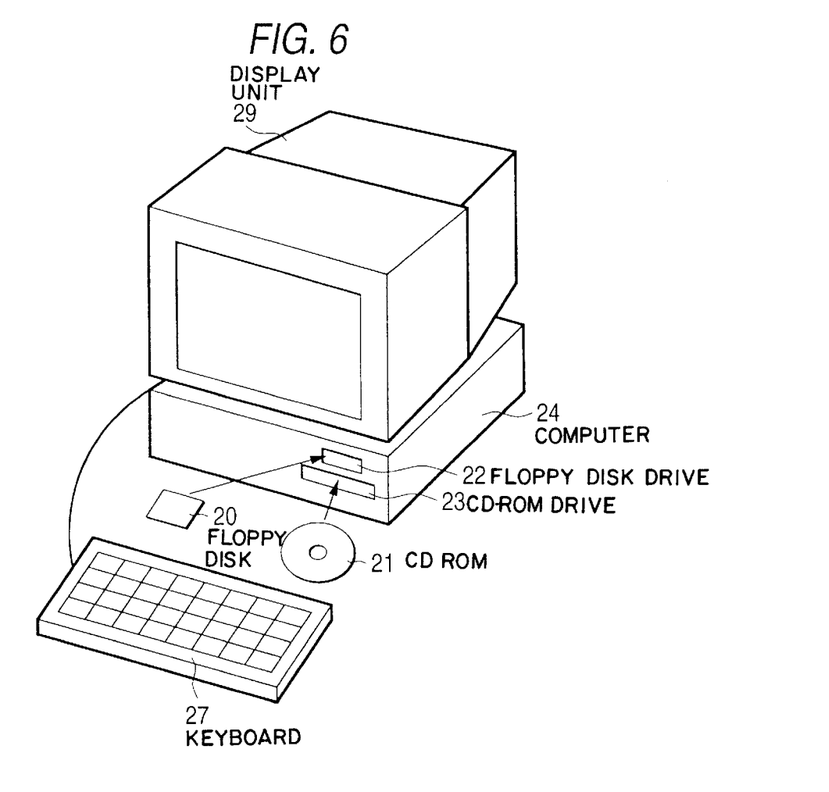
FIG. 6 is an illustration to show a system configuration incorporating a recording medium according to the invention.
Figure 7:
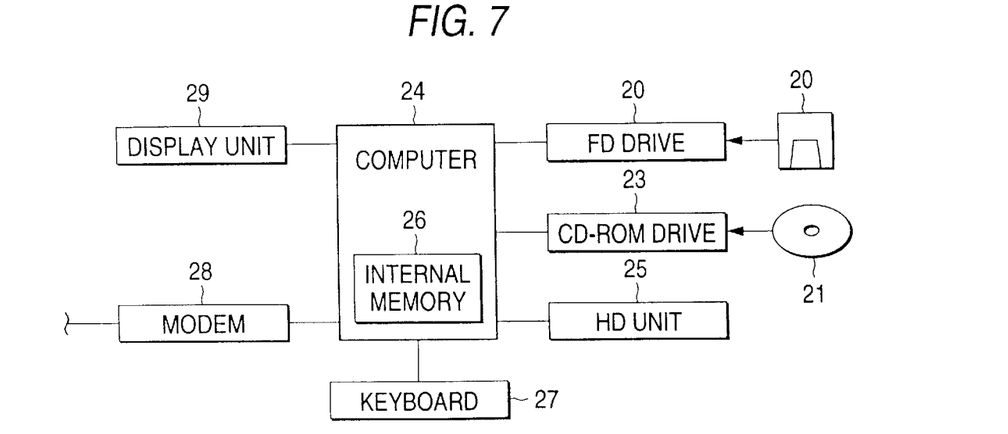
FIG. 7 is a diagram to show a system configuration incorporating a recording medium according to the invention.

As shown in FIG. 6 and FIG. 7, floppy disk (FD) 20, CD-ROM 21, or the like is available as the recording medium and the program stored on the recording medium 20 or 21 is installed through an FD drive 22 or a CD-ROM drive 23 on an HD unit 25 connected to or contained in a computer 24, whereby the computer 24 forms the system described in each embodiment.

Specifically, the storage sections 3, 11, and 18, the electronic mail storage sections 5 and 6, etc., are provided by the HD unit 25 and the junk electronic mail determination processing section 2, the exemplification learning sections 7 and 10, and the non-junk electronic mail feature amount extraction section 17 can be transferred from the HD unit 25 to internal memory 26 for performing processing at high speed, for example, each time they are used. The input section 1 is realized by a keyboard 27, a modem 28, etc. Further, the output section 8 corresponds to a CRT display (display unit) 29 in the figures, but any other output unit such as a printer can be used as the output section B.

As described above, the electronic mail determination method and system and the storage medium according to the invention have an exemplification learning function of automatically generating and storing a junk electronic mail determination condition by specifying at least a received junk electronic mail example. Thus, the junk electronic mail determination condition can be used to determine whether or not received electronic mail is junk, and determination condition generation work need not be executed by human hands. Electronic mail having contents similar to those of junk electronic mail having the contents completely matching one determination condition can be determined junk.

What is claimed is:

1. An electronic mail determination method comprising the steps of:

determining whether or not a given electronic mail piece is junk based on a determination condition stored in a junk electronic mail determination condition storage section;

if the electronic mail piece is determined junk, storing it in an estimated junk electronic mail storage section;

reading therein electronic mail piece stored in the estimated junk electronic mail storage section and analyzing contents of entire text of said electronic mail piece for extracting a feature amount to determine that said electronic mail piece is junk; and     adding the extracted feature amount to the junk electronic mail determination condition storage section as a junk electronic mail determination condition.

2. The electronic mail determination method as claimed in claim 1 wherein said determining step determines whether or not the determination condition is similar to the feature amount extracted from the given electronic mail piece.

3. The electronic mail determination method as claimed in claim 1 or 2 further comprising the steps of:

storing an electronic mail piece determined non-junk at said determining step in an estimated non-junk electronic mail storage section;

reading the electronic mail piece stored in the estimated non-junk electronic mail storage section and analyzing content information of the electronic mail piece for extracting a feature amount to determine that electronic mail is non-junk; and adding the extracted feature amount to the non-junk electronic mail determination condition storage section as a non-junk electronic mail determination condition, wherein said determining step determines whether or not the given electronic mail piece is junk based on the determination condition stored in the junk electronic mail determination condition storage section and the determination condition stored in the non-junk electronic mail determination condition storage section.

4. The electronic mail determination method as claimed in any one of the preceding claims further comprising the step of automatically deleting electronic mail stored in the estimated junk electronic mail storage section after the expiration of a predetermined time interval from the determining step time.

5. The electronic mail determination method as claimed in claim 3 further comprising the steps of:

extracting a feature amount of the electronic mail piece stored in the estimated non-junk electronic mail storage section;

storing the extracted feature amount in a non-junk electronic mail feature amount storage section; and subtracting the feature amount stored in the non-junk electronic mail feature amount storage section from feature amount generated based on junk electronic mail stored in the junk electronic mail storage section and storing the resultant feature amount in the junk electronic mail determination condition storage section as a junk electronic mail determination condition.

6. An electronic mail determination system comprising:

a junk electronic mail determination condition storage section for storing a determination condition to determine whether or not electronic mail is junk;

a junk electronic mail determination processing section for determining whether or not a given electronic mail piece is junk based on the determination condition stored in said junk electronic mail determination condition storage section;

an estimated junk electronic mail storage section for storing the electronic mail piece if the electronic mail piece is determined junk by said junk electronic mail determination processing section; and a junk electronic mail exemplification learning section for analyzing contents of entire text of said electronic mail piece stored in said estimated junk electronic mail storage section for extracting a feature amount to determine that said electronic mail piece is junk and adding the extracted feature amount to said junk electronic mail determination condition storage section as a junk electronic mail determination condition.

7. The electronic mail determination system as claimed in claim 6 wherein said junk electronic mail exemplification learning section generates a determination condition to determine a similar junk electronic mail piece, and wherein said junk electronic mail determination processing section determines whether or not the determination condition is similar to the feature amount extracted from the given electronic mail piece.

8. The electronic mail determination system as claimed in claim 6 or 7 further including:

an estimated non-junk electronic mail storage section for storing the electronic mail piece determined non-junk by said junk electronic mail determination processing section; and a non-junk electronic mail exemplification learning section for analyzing content information of the electronic mail piece stored in said estimated non-junk electronic mail storage section for extracting a feature amount to determine that electronic mail is non-junk and adding the extracted feature amount to said non-junk electronic mail determination condition storage section as a non-junk electronic mail determination condition, wherein said junk electronic mail determination processing section determines whether or not the given electronic mail piece is junk based on the determination condition stored in said junk electronic mail determination condition storage section and the determination condition stored in said non-junk electronic mail determination condition storage section.

9. The electronic mail determination system as claimed in claim 6 or 7 further including a deletion processing section for automatically deleting electronic mail stored in said estimated junk electronic mail storage section after the expiration of a predetermined time interval from the determination processing time.

10. The electronic mail determination system as claimed in claim 8 further including:

a non-junk electronic mail feature amount extraction section for extracting a feature amount of the electronic mail piece stored in said estimated non-junk electronic mail storage section; and a non-junk electronic mail feature amount storage section for storing the extracted feature amount, wherein said junk electronic mail exemplification learning section subtracts the feature amount stored in said non-junk electronic mail feature amount storage section from feature amount generated based on junk electronic mail stored in said junk electronic mail storage section and adopts the resultant feature amount as a junk electronic mail determination condition.

11. A computer-readable recording medium storing an electronic mail determination program containing instructions for causing a computer to execute the steps of:

determining whether or not a given electronic mail piece is junk based on a determination condition stored in a junk electronic mail determination condition storage section;

if the electronic mail piece is determined junk, storing it in an estimated junk electronic mail storage section;

reading the electronic mail piece stored in the estimated junk electronic mail storage section and analyzing contents of entire text of said electronic mail piece for extracting a feature amount to determine that said electronic mail piece is junk; and adding the extracted feature amount to the junk electronic mail determination condition storage section as a junk electronic mail determination condition.

12. The computer-readable recording medium as claimed in claim 11 wherein said determining step is a program for determining whether or not the determination condition is similar to the feature amount extracted from the given electronic mail piece.

13. The computer-readable recording medium as claimed in claim 11 or 12 further storing a program for causing a computer to execute the steps of:

storing an electronic mail piece determined non-junk at said determining step in an estimated non-junk electronic mail storage section;

reading the electronic mail piece stored in the estimated non-junk electronic mail storage section and analyzing content information of the electronic mail piece for extracting a feature amount to determine that electronic mail is non-junk; and adding the extracted feature amount to the non-junk electronic mail determination condition storage section as a non-junk electronic mail determination condition, wherein said determining step determines whether or not the given electronic mail piece is junk based on the determination condition stored in the junk electronic mail determination condition storage section and the determination condition stored in the non-junk electronic mail determination condition storage section.

14. The computer-readable recording medium as claimed in claim 11 or 12 further storing a program for causing a computer to execute the step of automatically deleting electronic mail stored in the estimated junk electronic mail storage section after the expiration of a predetermined time interval from the determining step time.

15. The computer-readable recording medium as claimed in claim 13 further storing a program for causing a computer to execute the steps of:

extracting a feature amount of the electronic mail piece stored in the estimated non-junk electronic mail storage section;

storing the extracted feature amount in a non-junk electronic mail feature amount storage section; and subtracting the feature amount stored in the non-junk electronic mail feature amount storage section from feature amount generated based on junk electronic mail stored in the junk electronic mail storage section and storing the resultant feature amount in the junk electronic mail determination condition storage section as a junk electronic mail determination condition.

16. The electronic mail determination method as claimed in claim 4 further comprising the steps of:

extracting a feature amount of the electronic mail piece stored in the estimated non-junk electronic mail storage section;

storing the extracted feature amount in a non-junk electronic mail feature amount storage section; and subtracting the feature amount stored in the non-junk electronic mail feature amount storage section from feature amount generated based on junk electronic mail stored in the junk electronic mail storage section and storing the resultant feature amount in the junk electronic mail determination condition storage section as a junk electronic mail determination condition.

17. The electronic mail determination system as claimed in claim 8 further including a deletion processing section for automatically deleting electronic mail stored in said estimated junk electronic mail storage section after the expiration of a predetermined time internal from the determination processing time.

18. The electronic mail determination system as claimed in claim 9 further including:

a non-junk electronic mail feature amount extraction section for extracting a feature amount of the electronic mail piece stored in said estimated non-junk electronic mail storage section; and a non-junk electronic mail feature amount storage section for storing the extracted feature amount, wherein said junk electronic mail exemplification learning section subtracts the feature amount stored in said non-junk electronic mail feature amount storage section from feature amount generated based on junk electronic mail stored in said junk electronic mail storage section and adopts the resultant feature amount as a junk electronic mail determination condition.

19. The computer-readable recording medium as claimed in claim 13 further storing a program for causing a computer to execute the step of automatically deleting electronic mail stored in the estimated junk electronic mail storage section after the expiration of a predetermined time interval from the determining step time.

20. The computer-readable recording medium as claimed in claim 14 further storing a program for causing a computer to execute the steps of:

extracting a feature amount of the electronic mail piece stored in the estimated non-junk electronic mail storage section;

storing the extracted feature amount in a non-junk electronic mail feature amount storage section; and subtracting the feature amount stored in the non-junk electronic mail feature amount storage section from feature amount generated based on junk electronic mail stored in the junk electronic mail storage section and storing the resultant feature amount in the junk electronic mail determination condition storage section as a junk electronic mail determination condition.

* * * * *